United States Patent [19]

Kawamoto

[11] Patent Number: 4,467,670

[45] Date of Patent: Aug. 28, 1984

[54] BELT DRIVE CONTINUOUSLY-VARIABLE SPEED AUTOMATIC TRANSMISSION

[75] Inventor: Mutsumi Kawamoto, Aichi, Japan

[73] Assignee: Aisin Warner Kabushiki Kaisha, Aichi, Japan

[21] Appl. No.: 342,968

[22] Filed: Jan. 26, 1982

[30] Foreign Application Priority Data

Feb. 4, 1981 [JP] Japan ................................ 56-15344

[51] Int. Cl.³ ........................ F16H 37/00; F16H 9/00
[52] U.S. Cl. ........................................ 74/689; 74/740; 474/72
[58] Field of Search ............... 74/689, 740, 687, 788; 474/8, 18, 28, 29, 171, 72

[56] References Cited

U.S. PATENT DOCUMENTS

| | | | |
|---|---|---|---|
| 2,080,279 | 5/1937 | Kellogg | 474/171 |
| 2,672,769 | 3/1954 | Gerst | 74/788 |
| 3,289,496 | 12/1966 | Hoover | 474/171 |
| 3,577,804 | 5/1971 | Ohno | 74/688 |
| 4,060,012 | 11/1977 | Giacosa | 74/689 |
| 4,125,037 | 11/1978 | Palmer et al. | 474/28 |
| 4,290,295 | 9/1981 | Kanamaru et al. | 474/171 |
| 4,342,238 | 8/1982 | Gardner | 74/689 |

FOREIGN PATENT DOCUMENTS

583042  2/1957  Italy ................................ 74/689

*Primary Examiner*—Lawrence J. Staab
*Assistant Examiner*—Bruce F. Wojciechowski
*Attorney, Agent, or Firm*—Blum, Kaplan, Friedman, Silberman & Beran

[57] ABSTRACT

A continuously-variable speed automatic transmission, comprising a fluid coupling, a belt drive transmission means including a primary variable-pitch pulley, a secondary variable-pitch pulley and a belt interconnecting the primary and the secondary variable-pitch pulley and capable of attaining continuously-variable speed drive, and a change-direction gear train.

The primary variable-pitch pulley is mounted on an intermediate shaft which is adapted to be freely rotatable and arranged coaxially with an input shaft connected with the turbine runner of the fluid coupling.

The secondary variable-pitch pulley is mounted on the output shaft of the transmission, which is supported on the housing of the transmission rotatably and in parallel with the intermediate shaft.

The change-direction gear train is connected at the input end thereof with the input shaft and at the output end thereof with the intermediate shaft.

A clutch means for rotatively connecting the input shaft and the intermediate shaft is formed within the fixed pulley flange of the primary variable-pitch pulley of the belt drive transmission means.

8 Claims, 4 Drawing Figures

BELT DRIVE CONTINUOUSLY-VARIABLE SPEED AUTOMATIC TRANSMISSION

BACKGROUND OF THE INVENTION

The present invention relates to an improvement in an automatic transmission equipped with a belt drive continuously-variable speed transmission means, which comprises two variable-pitch pulleys and a belt of a V-shape or a trapezoidal cross section extended between the variable-pitch pulleys and is adapted to vary the rotational speed ratio between the respective shafts carrying the variable-pitch pulleys by varying the radial working position of the belt on the variable-pitch pulleys.

There has been known that a continuously-variable speed transmission means, designated as "a belt drive transmission means" hereinafter, comprises a primary variable-pitch pulley and a secondary variable-pitch pulley mounted on an input shaft connected to a prime mover and an output shaft connected to a driven unit respectively, each variable-pitch pulley comprising a fixed pulley flange fixed to the corresponding shaft, a movable pulley flange mounted axially slidably on the same shaft and a spring or the like means urging the movable pulley flange toward the corresponding fixed pulley flange, and a V-belt extended between the primary and the secondary variable-pitch pulleys.

Recently, a link belt, which is formed by linking a number of metallic blocks, each having a cross section similar to that of a V-belt and inclined side surfaces formed so as to fit to the conical surfaces of the fixed and movable pulley flanges and having slits formed in the inclined side surfaces, with metallic belts by fitting the metallic belts in the slits of the metallic blocks, has been developed. The employment of such a link belt in the belt drive transmission means contributes to enhancing the durability of the belt drive transmission means. Thus, trials have been made to employ the belt drive transmission means as an automatic transmission for a motor vehicle equipped with a high-power mover by increasing the transmission torque of the belt drive transmission means by pressing the movable pulley flanges toward the corresponding fixed pulley flanges with hydraulic servomechanisms.

SUMMARY OF THE INVENTION

In accordance with the present invention, a continuously-variable speed automatic transmission for motor vehicle equipped with a belt drive transmission means is provided. In said automatic transmission, the input shaft end of the belt drive transmission means is connected to the output shaft of the prime mover through a fluid coupling such as a hydraulic torque converter or through a coupling means such as a dry or wet clutch, the fixed pulley flange of the primary variable-pitch pulley is fixed to an intermediate shaft which is discrete from the input shaft connected to the output end of the coupling, the fixed pulley flange of the primary variable-pitch pulley is adapted to be rotatable with respect to the input shaft, a clutch is formed between the fixed pulley flange fixed to the intermediate shaft and the input shaft end, a change direction gear train such as a planetary gear mechanism is constructed between the input shaft and the intermediate shaft, and a hydraulic servomechanism is provided between the input shaft and the fixed flange of the primary variable-pitch pulley. Thus the belt drive transmission means is arranged to attain continuously-variable speed change of forward rotation when the input shaft and the intermediate shaft are connected by means of the clutch and to attain continuously-variable speed change of the reverse rotation when the shafts are connected through the change-direction gear mechanism so that a compact belt drive continuously-variable speed automatic transmission is provided.

The primary object of the present invention is to provide a compact continuously-variable speed automatic transmission equipped with a belt drive transmission means, more particularly, to provide a compact continuously-variable speed automatic transmission equipped with the belt drive transmission means wherein a primary variable-pitch pulley is mounted on an intermediate shaft which is adapted to be freely rotatable and is arranged coaxially with respect to an input shaft and a change-direction gear train is mounted on the input shaft or the intermediate shaft, and capable of attaining continuously-variable speed change both in the forward range as well as in the reverse range.

DESCRIPTION OF THE PREFERRED EMBOIDMENTS

Figure 1:
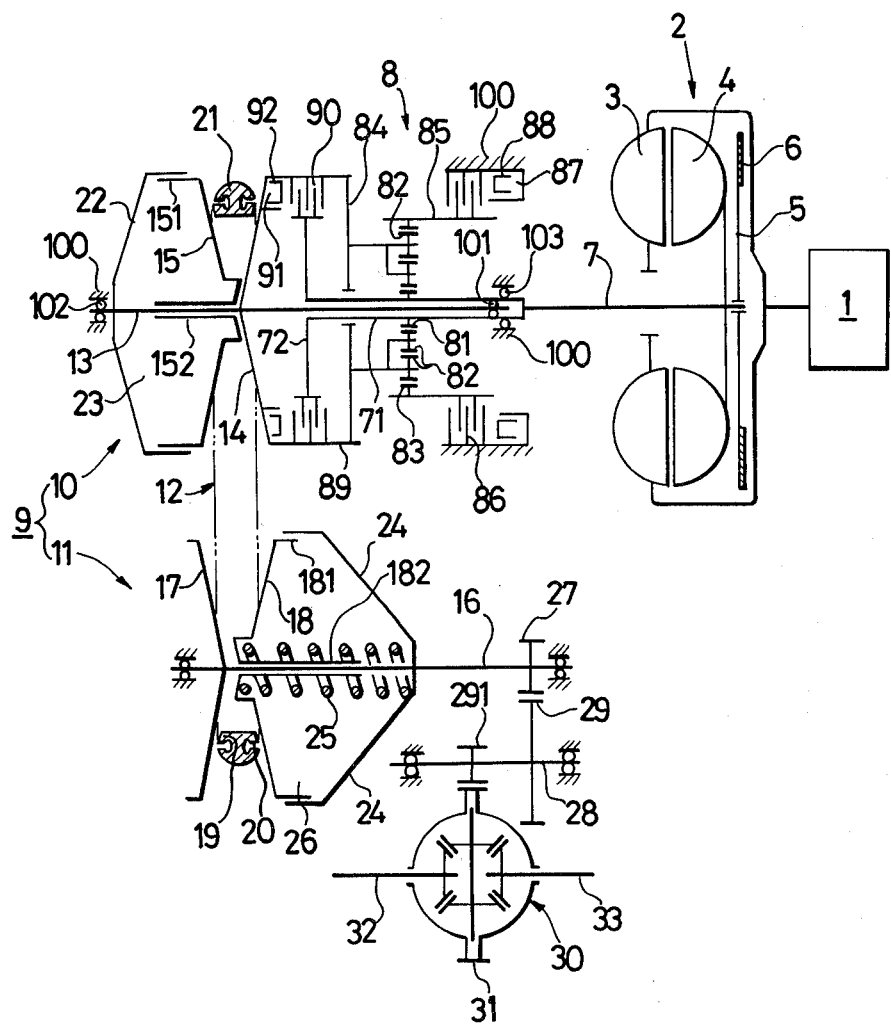
FIG. 1 is a schematic illustration of one embodiment of a belt drive continuously-variable speed automatic transmission in accordance with the present invention.
Figure 2:
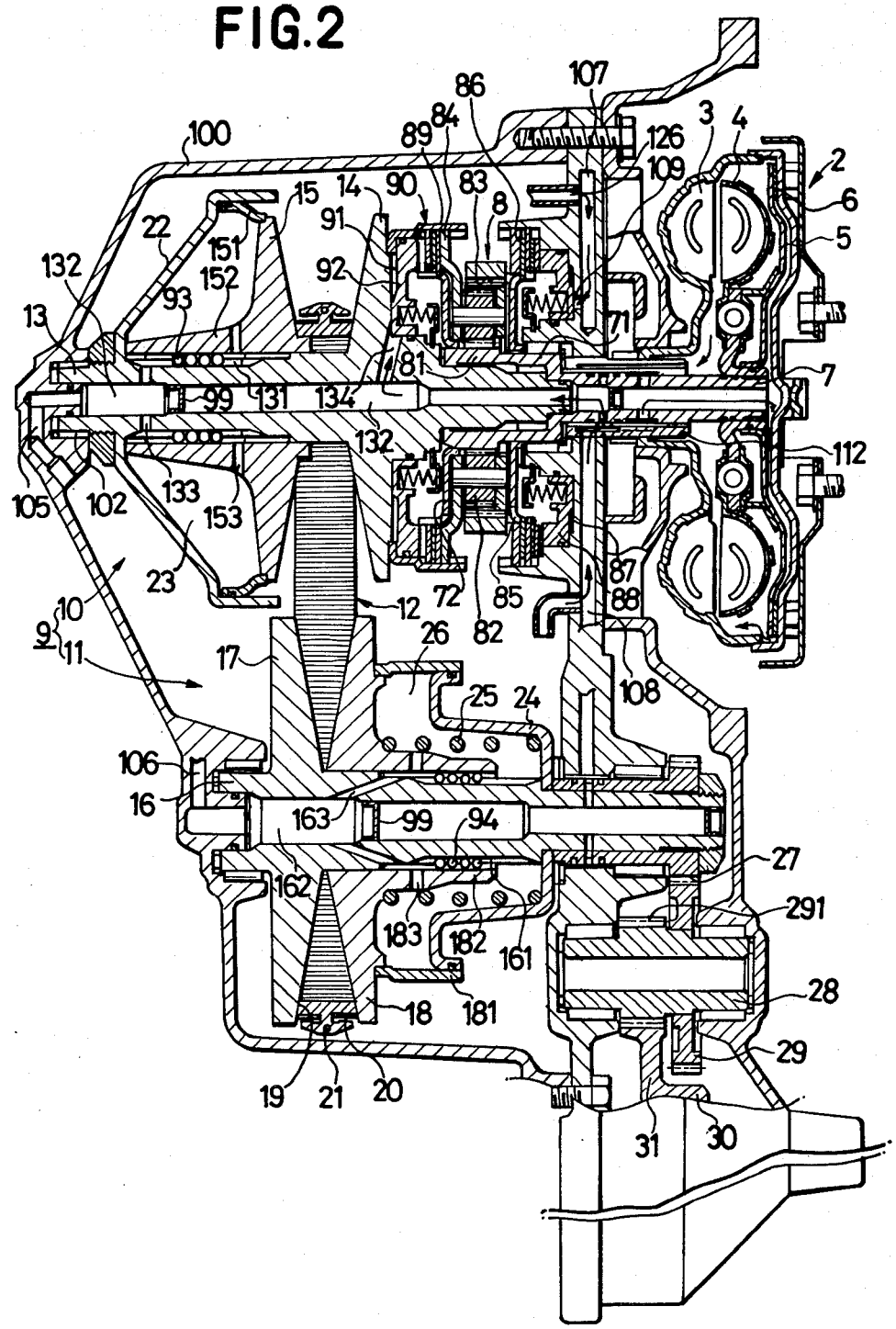
FIG. 2 is a sectional view of the essential part of the belt drive continuously-variable speed automatic transmission of FIG. 1.

The invention will now be described in detail, by way of example, with reference to the accompanying drawings in which:

FIG. 1 is a schematic illustration of an automatic transmission for a motor vehicle equipped with a fluid coupling embodying the present invention, FIG. 2 is a sectional view of the essential part of the automatic transmission.

In the drawings, an output shaft of an engine 1 is connected with a pump impeller 3 of a fluid coupling 2. A turbine runner 4 of the fluid coupling 2 is connected with an input shaft 7 of the automatic transmission. A direct-coupling clutch for directly connecting the turbine runner 4 or the input shaft 7 and the housing of the fluid coupling 2 is formed. For this object, a clutch plate comprising a piston 5 having a circular frictional plate 6 fixed on one surface thereof is slidably mounted either on the turbine runner 4 or the input shaft 7.

The automatic transmission generally comprises a planetary gear mechanism 8 and a belt drive transmission means 9. The belt drive transmission means 9 comprises generally a primary variable-pitch pulley 10, a secondary variable-pitch pulley 11 and a belt 12. The primary variable-pitch pulley 10 comprises a fixed pulley flange 14 formed concentrically and integrally with an intermediate shaft 13 of the belt drive transmission means and a movable pulley flange 15 mounted axially slidably on the intermediate shaft 13. The secondary variable-pitch pulley 11 comprises a fixed pulley flange 17 formed concentrically and integrally with an output shaft 16 and a movable pulley flange 18 mounted axially slidably on the output shaft 16. The belt 12 is extended between the primary and the secondary variable-pitch pulleys. The belt 12 is, for example, an endless belt of a kind disclosed in the Laid-Open Gazette for patent application No. 52253/1979, which is formed by arranging a number of metallic blocks 21 in a file and by linking a number of the blocks 21 with metallic bands. Each metallic block 21 has inclined side surfaces 19, 19 on its both sides which fit in the V-shaped grooves of the primary variable-pitch pulley 10 and the secondary variable-pitch pulley 11 and slits 20 formed in the inclined side surfaces 19 for receiving the metallic bands therein.

A cylinder 22 is fixed to the intermediate shaft 13 in liquid-tight engagement with an annular member 151 fixed to the periphery of the movable pulley flange 15 of the primary variable-pitch pulley 10 to form a hydraulic servomechanism for sliding the movable pulley flange 15 toward the fixed pulley flange 14 by supplying pressurized fluid into a cylinder chamber 23 of the cylinder 22 so that the metallic blocks 21 consisting the belt 12 are pressed between the fixed pulley flange 14 and the movable pulley flange 15. A cylinder 24 is fixed to the output shaft 16 in liquid-tight engagement with a cylindrical member 181 welded to the movable pulley flange 18 of the secondary variable-pitch pulley 11, a coil spring 25 is compressed between the cylinder 24 and the movable pulley flange 18 to form a hydraulic servomechanism for sliding the movable pulley flange 18 toward the fixed pulley flange 17 in conjunction with the force of the spring 25 by the pressure of the fluid supplied in a cylinder chamber 26 of the cylinder 24 so that the metallic blocks 21 consisting the belt 12 are pressed between the fixed pulley flange 17 and the movable pulley flange 18. The pressure-receiving area of the cylinder 22 facing the movable pulley flange 15 of the primary variable-pitch pulley 10 facing against the cylinder chamber 23 is made greater than the pressure-receiving area of the movable pulley flange 18 of the secondary variable-pitch pulley 11 facing against the cylinder chamber 26.

When the pressurized fluid is drained from the both cylinder chambers 23 and 26, the movable pulley flange 18 of the secondary variable-pitch pulley 11 is moved toward the corresponding fixed pulley flange 17 so that the belt 12 is moved to the outermost radial position on the secondary variable-pitch pulley 11 whereas the belt 12 is moved to the innermost radial position on the primary variable-pitch pulley 10, since the movable pulley flange 18 of the secondary variable-pitch pulley 11 is continuously urged toward the corresponding fixed pulley 17 with the coil spring 25 while no force is applied within the primary variable-pitch pulley 10. In this state, the reduction ratio of the rotational speed transmission from the intermediate shaft 13 to the output shaft 16 is the highest and the torque ratio between the intermediate shaft 13 and the output shaft 16 also is the highest.

When the intermediate shaft 13 is connected to the input shaft 7 and pressurized fluid is supplied to the cylinder chambers 23 and 26 of the hydraulic servomechanisms, the belt 12 is pressed between the respective fixed pulley flanges and the movable pulley flanges of the primary variable-pitch pulley 10 and the secondary variable-pitch pulley 11 and transmits the rotation of the input shaft 7 to the output shaft 16. When pressurized fluid of the same pressure is supplied to the cylinder chamber 23 and 26, the axial pressing force of the movable flange 15 of the primary variable-pitch pulley 10 applied to the belt 12 is greater than that of the movable flange 18 of the secondary variable-pitch pulley 11 applied to the belt 12, since the pressure-receiving area of the movable flange 15 of the primary variable-pitch pulley 10 is greater than that of the movable pulley flange 18 of the secondary variable-pitch pulley 11, so that the belt 12 is moved radially outward with regard to the intermediate shaft 13 whereby the working radius of the primary variable-pitch pulley 10 cooperating with the belt 12 is increased whereas the working radius of the secondary variable-pitch pulley 11 cooperating with the belt 12 is decreased. Such relative operation of the variable-pitch pulleys 10 and 11 and the belt 12 reduces the reduction ratio of the rotational transmission from the intermediate shaft 13 to the output shaft 16 as well as the torque ratio, thus attaining continuously-variable speed change. It is necessary to balance the pressing force applied to the movable pulley flanges 15 and 18 in order to maintain the belt 12 at a steady position. The reduction ratio (the torque ratio) is maintained at a desired value and the belt 12 is maintained at a steady position on the primary and the secondary variable-pitch pulleys by reducing the pressure of the pressurized fluid supplied to the cylinder 23 of the primary variable-pitch pulley 10 with respect to that supplied to the cylinder 26 of the secondary variable-pitch pulley 11.

A reduction gear train comprises a gear wheel 27 fixed to the output shaft 16, a gear wheel 29 meshing with the gear wheel 27 and fixed to a counter shaft 28, a gear wheel 291 formed integrally with the gear wheel 29 and a gear wheel 31 fixed to the casing of a differential gear 30 and meshing with the gear wheel 291. The rotation of the output shaft 16 is reduced and transmitted to the driving axles 32 and 33 of the vehicle through the differential gear 30.

The input shaft 7 and the intermediate shaft 13 are disposed coaxially within the housing 100 of the automatic transmission. One end of the intermediate shaft 13 is inserted into a hollow shaft portion 71 formed on one end of the input shaft 7 and supported in a bearing 101 on the input shaft 7. The other end of the intermediate shaft 13 is rotatably supported in a bearing 102 on the housing 100. The input shaft 7 is supported rotatably in a bearing 103 on the housing 100 at an axial position adjacent to or corresponding to the bearing 101 provided at the position radially outward of the bearing 101.

The planetary gear mechanism 8 comprises a sun gear 81 mounted on the hollow shaft portion 71 concentrically with the input shaft 7, double planetary pinions 82, a ring gear 83 and a planetary carrier 84 rotatably carrying the planetary pinions 82. The sun gear 81 is formed integrally with the hollow shaft portion 71. The planetary pinions 82 are meshing with each other, one of which is meshed with the sun gear 81 while the other is meshed with the ring gear 83. A multiple-disc brake 86 is formed between a drum 85 formed integrally with the ring gear 83 and the housing 100 of the automatic transmission. The ring gear 83 is controlled to be engaged with the housing 100 or to be allowed to rotate by means of a hydraulic servomechanism comprising a cylinder 87 formed in the housing 100 and a piston 88. The planetary carrier 84 is engaged with a hub 89 attached to the periphery of the fixed pulley flange 14 by means of spline coupling so that the planetary carrier 84 is rotated together with the intermediate shaft 13. A clutch hub 72 is fixed to one end of the hollow shaft portion 71 of the input shaft 7. A multiple-disc clutch 90 is formed between the clutch hub 72 and the hub 89 of the fixed pulley flange 14. The multiple-disc clutch 90 is operated by a hydraulic servomechanism comprising a cylinder 91 formed by the back side of the fixed pulley flange 14 and the hub 89 and a piston slidably fitted in the cylinder 91 so that the intermediate shaft 13 is adapted to be engaged to or released from the input shaft 7.

It will be noted particularly in FIG. 2 that the respective movable pulley flanges 15 and 18 of the primary and the secondary variable-pitch pulleys 10 and 11 are provided with cylindrical bosses 152 and 182 formed integrally with the movable pulley flanges 15 and 18 respectively. The respective cylindrical bosses 152 and 182 are partly in liquid-tight contact with the outside surfaces of the intermediate shaft 13 and the output shaft 16 respectively, while partly supported by spherical members 93 and 94 arranged within axial grooves 131 and 161 of the intermediate shaft 13 and the output shaft 16 respectively.

Pressurized fluid is supplied into the cylinder 23 of the hydraulic servomechanism of the primary variable-pitch pulley 10 via a passage 105 formed in the housing 100, an axial hole 132 formed in the intermediate shaft 13, a through hole 133 and the axial groove 131 formed in the intermediate shaft 13, and a through hole 153 formed in the cylindrical boss 152, or drained via the same passage in the reverse direction. Pressurized fluid is supplied into the cylinder 26 of the hydraulic servomechanism of the secondary variable-pitch pulley 11 via a passage 106 formed in the housing 100, an axial hole 162 and a through hole 163 formed in the output shaft 16, the axial groove 161 and a through hole 183 formed in the cylindrical boss 182, or drained via the same passage in the reverse direction.

Pressurized fluid is supplied into or drained from the cylinder 87 of the hydraulic servomechanism for operating the multiple-disc brake 86 via a passage 107 and 109 formed in the housing 100. Pressurized fluid is supplied into the cylinder 91 of the hydraulic servomechanism for operating the clutch 90 via a passage 108 formed in the housing 100, the axial hole 133 formed in the intermediate shaft 13 and a through hole 134 formed in the intermediate shaft 13, or drained via the same passage in the reverse direction. In FIG. 2, plugs fitted in the axial holes 132 and 162 are indicated by reference In the drawings, an embodiment of the present invention equipped with a fluid coupling is shown, however, a torque converter, comprising a pump impeller, a turbine runner and a stator supported on its housing with a one-way clutch, may replace the fluid coupling. When such a torque converter is employed, the pump impeller and the turbine runner are connected to the output end of the prime mover and the input end of the automatic transmission respectively. A conventional coupling means such as a dry or wet clutch may be replaced between the output end of the prime mover and the input shaft with the fluid coupling.

Figure 3:
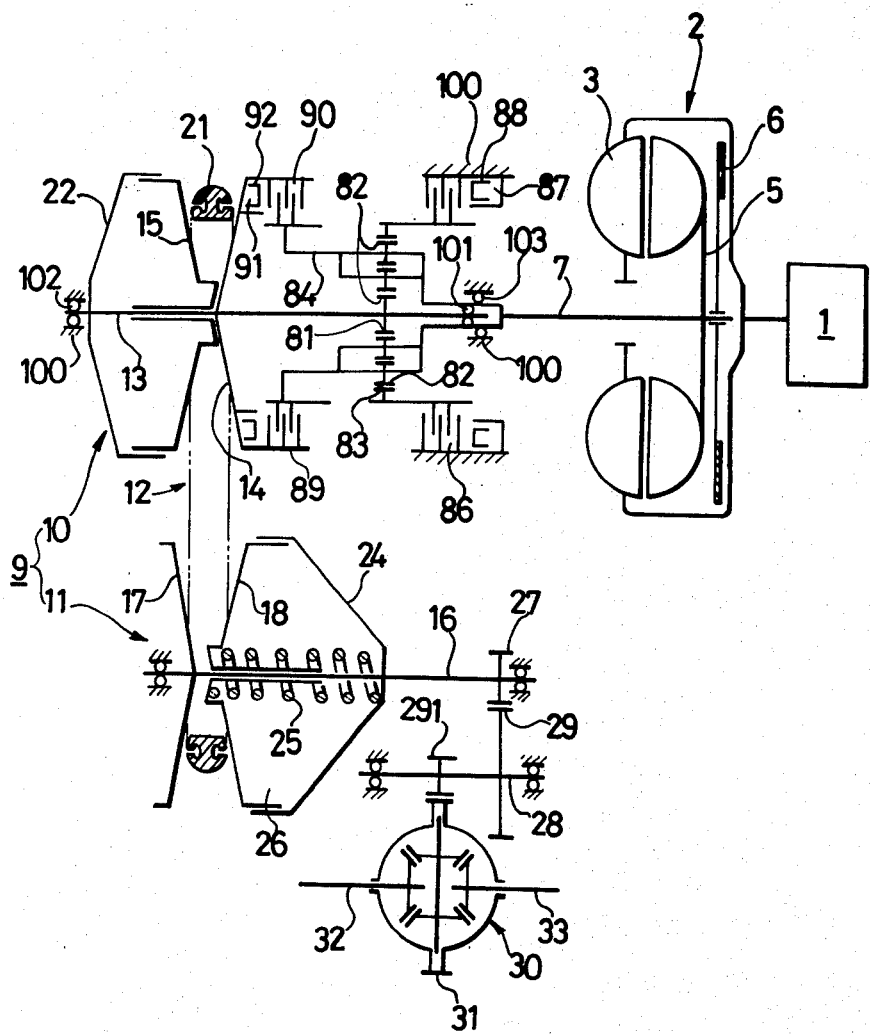
FIGS. 3 and 4 are schematic illustrations of other embodiments of the belt drive continuously-variable speed automatic transmissions in accordance with the present invention, respectively.
Figure 4:
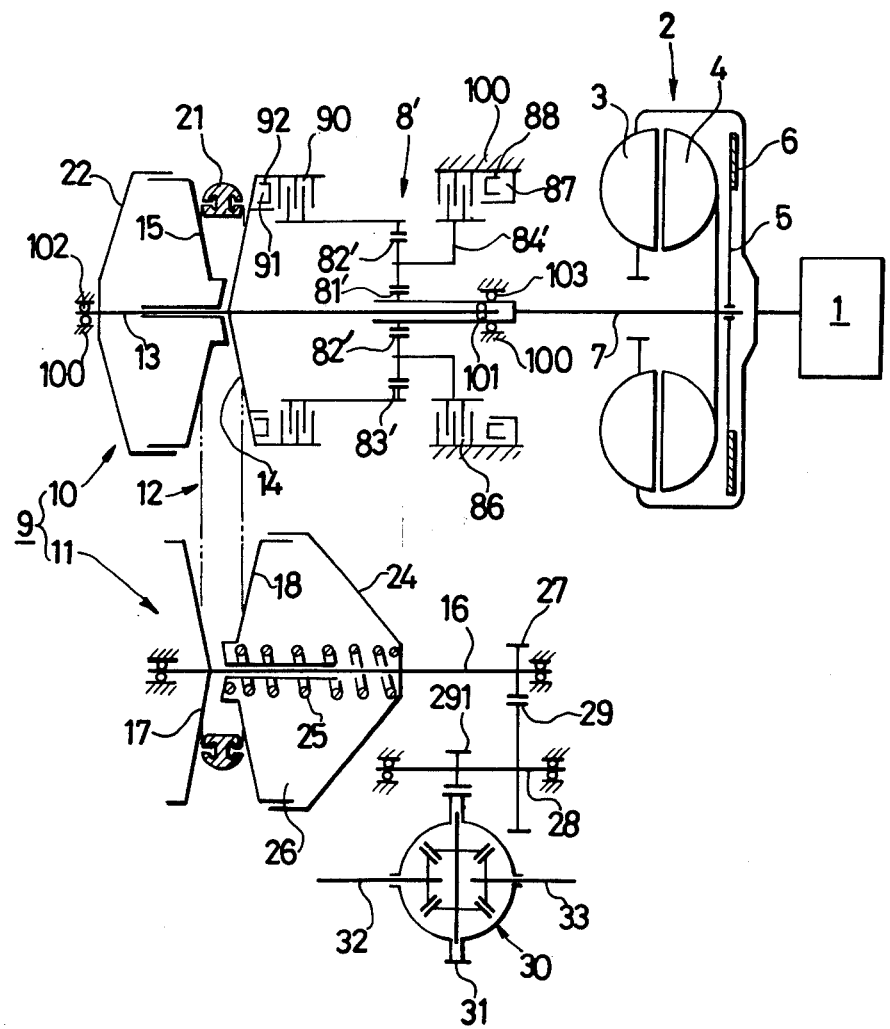

FIGS. 3 and 4 show further embodiments of the present invention equipped with modified change-direction gear trains.

The gear train of FIG. 3 is a planetary gear mechanism 8 comprising a sun gear 81 concentrically mounted on the intermediate shaft 13, double planetary pinions 82, a ring gear 83 and a planetary carrier 84 rotatably carrying the planetary pinions 82. The planetary carrier 84 is fixed to the input shaft 7. A multiple-disc clutch 90 adapted to be operated by a hydraulic servomechanism including a cylinder 91 and a piston 92 is formed between the carrier 84 and the hub 89 of the fixed pulley flange 14. A multiple-disc brake 86 adapted to be operated by a hydraulic servomechanism including a cylinder 87 and a piston 88 is formed between the ring gear 82 and the housing 100.

The gear train of FIG. 4 is also a planetary gear mechanism comprising a sun gear 81' mounted on the hollow shaft portion 71 concentrically with the input shaft 7, at least one planetary pinion 82' meshing with the sun gear 81' as well as with a ring gear 83' and a planetary carrier 84' rotatably carrying the planetary pinion 82'. A multiple-disc clutch 90 adapted to be operated by a hydraulic servomechanism including a cylinder 91 and a piston 92 is formed between the ring gear 83' and the hub 89 of the fixed pulley flange 14. A multiple-disc brake 86 adapted to be operated by a hydraulic servomechanism including a cylinder 87 and a piston 88 is formed between the planetary carrier 84' and the housing 100.

In a belt drive continuously-variable speed automatic transmission described hereinbefore, an input shaft connected to the output end of a coupling functioning the input shaft to connect to or disconnect from the output end of the prime mover and an intermediate shaft disposed coaxially with the input shaft are rotatably supported on a housing, an output shaft is supported on the housing in parallel with the input shaft and the intermediate shaft, a primary variable-pitch pulley is constructed on the intermediate shaft with a fixed pulley flange fixed coaxially to the intermediate shaft and a movable pulley flange axially slidable with respect to the fixed pulley flange, a secondary variable-pitch pulley is constructed on the output shaft with a fixed pulley flange fixed concentrically to the output shaft and a movable pulley flange axially slidable with respect to the fixed pulley flange, and a belt is extending between the primary and the secondary variable-pitch pulleys. Thus a belt drive transmission means is constructed between the intermediate shaft and the output shaft, so that the respective radial working positions of the belt on the primary and the secondary variable-pitch pulleys are changed to change the rotational reduction ratio between the intermediate shaft and the output shaft. The automatic transmission further comprises a clutch disposed between the input shaft and the fixed pulley flange of the primary variable-pitch pulley mounted on the intermediate shaft for engaging the fixed pulley flange with the input shaft, and a change-direction gear train, such as a planetary gear mechanism, mounted on the input shaft. The output end of the gear train is connected with the intermediate shaft while the input end of the gear train is connected with the input shaft, and a brake for changing the rotational direction of the gear train is formed between a component member of the gear train and the housing. In the forward operation mode, the clutch disposed between the end of the input shaft and the fixed pulley flange of the primary variable-pitch pulley mounted on the intermediate shaft is engaged and the brake for the change-direction gear train is released so that the input shaft is directly connected to the intermediate shaft whereby the driving torque of the prime mover is transmitted directly from the input shaft connected to the output end of the fluid coupling to the primary variable-pitch pulley which in turn transmits the driving torque to the output shaft through the belt drive continuously-variable speed transmission means, whereas in the reverse operation mode, the clutch is released to disconnect the intermediate shaft from the input shaft and the brake is engaged so that the rotation of the input shaft is changed in the reverse rotational direction through the change-direction gear train, then transmitted to the primary variable-pitch pulley whereby the continuously and automatically controlled reverse rotation is transmitted to the output shaft.

According to the present invention, in particular, a clutch is provided to connect and disconnect the end of the input shaft and the fixed pulley flange of the primary variable-pitch pulley mounted on the intermediate shaft, therefore, the hydraulic servomechanism or other mechanisms for controlling the clutch can be formed within the fixed pulley flange of the primary variable-pitch pulley so that the axial lengths of the input shaft and the intermediate shaft can be reduced. Furthermore, when a hydraulic servomechanism is employed in operating the clutch, the cylinder of the hydraulic servomechanism can be formed within the fixed pulley flange of the primary variable-pitch pulley, thus facilitating the installation of the hydraulic servomechanism, and at the same time, pressurized working fluid can be supplied directly to the cylinder of the hydraulic servomechanism via a passage formed by the axial hole of the intermediate shaft and a passage formed in the fixed pulley flange, thus simplifying the construction of the hydraulic servomechanism as compared with construction in which a discrete hydraulic servomechanism is mounted on the intermediate shaft.

When an planetary gear mechanism comprising a double planetary pinions, a sun gear and a ring gear is employed as the change-direction gear train, the reverse rotation of a desired reduction ratio is attained when a change-direction brake is actuated, thus the automatic transmission having a high torque reverse range is constructed. When the planetary gear mechanism is employed as the change-director gear train, it is necessary to engage the planetary carrier rotatably supporting the double planetary pinions with the intermediate shaft, to fix the sun gear to the input shaft and to provide a brake to connect and disconnect the ring gear and the housing. However, the output end of the planetary gear mechanism can be engaged with the fixed pulley flange of the primary variable-pitch pulley quite easily by engaging the planetary carrier with a cylindrical hub formed concentrically on the fixed pulley flange of the primary variable-pitch pulley by means of a spline coupling and the cylindrical hub is available for forming the cylinder of the hydraulic servomechanism for controlling the clutch disposed between the fixed pulley flange and the end of the input shaft. When a multiple-disc clutch is employed as the clutch, a clutch hub formed at the free end of the input shaft is disposed within the cylindrical hub and friction discs are provided between the clutch hub and the cylindrical hub, so that a hydraulic servomechanism for operating the clutch formed easily by utilizing the cylindrical hub of the fixed pulley flange, and the belt drive continuously-variable speed automatic transmission can be formed in an extremely compact construction.

Furthermore, when one end of the intermediate shaft is mounted to be freely rotatable in a hollow shaft portion of the input shaft which is disposed coaxially with the intermediate shaft, the axial length of the shaft carrying the primary variable-pitch pulley can be reduced by mounting the change-direction gear train, such as a planetary gear mechanism, on the hollow shaft portion of the input shaft, and at the same time, the input shaft and the intermediate shaft can be supported on the housing with three bearings, including a bearing supporting the other end of the intermediate shaft on the housing, by supporting one end of the intermediate shaft in a bearing in the hollow shaft portion of the input shaft and by supporting the input shaft on the housing in a bearing disposed at an axial position near the bearing supporting one end of the intermediate shaft in the hollow shaft portion of the input shaft, so that the axial length of the belt drive continuously-variable speed automatic transmission can be reduced as well as the shaft supporting mechanism can be simplified.

Still further, the belt drive continuously-variable speed automatic transmission means of the present invention comprises a belt drive transmission means including a primary variable-pitch pulley mounted on an intermediate shaft, a secondary variable-pitch pulley mounted on an output shaft, and a belt extended between the primary and the secondary variable-pitch pulleys, and is adapted to change the rotational speed ratio between the intermediate shaft and the output shaft steplessly by varying the radial working positions of the belt on the primary and the secondary variable-pitch pulleys, therefore, the rotational speed and the torque of the input shaft are changed and converted, respectively, steplessly, cooperating with the function of a fluid coupling, and then transmitted to the output shaft. Thus the belt drive continuously-variable speed automatic transmission of the present invention equipped with the belt drive continuously-variable speed transmission means and a change-direction gear train is extremely advantageous particularly for automatic transmission for motor vehicles.

Still further, the change-direction gear train employed in the present invention is not limited to a planetary gear mechanism, but any known mechanism, such as a gear train constructed by the combination of bevel gears, which is known as a differential gear mechanism, may be employed provided that the mechanism is capable of causing one of two freely rotatable and coaxial shafts to be rotated in the opposite direction with respect to the other by the operation of a brake and also capable of causing the two freely rotatable and coaxial shafts to be rotated in the same direction with the brake in the released position.

What is claimed is:

1. A belt drive continuously-variable speed automatic transmission comprising:
   a housing;
   an input shaft;
   an intermediate shaft supported coaxially with and rotatably relative to said input shaft;
   first means to rotatably support one end of said intermediate shaft, second means carried by said input shaft to rotatably support the other end of said intermediate shaft;
   an output shaft supported in said housing in parallel with said input shaft and said intermediate shaft;
   a belt drive continuously-variable speed transmission means including a primary variable-pitch pulley having a fixed pulley flange fixed to said intermediate shaft concentrically thereto and a movable pulley flange mounted axially slidably on said intermediate shaft relative to said fixed pulley flange, a secondary variable-pitch pulley having a fixed pulley flange fixed to said output shaft concentrically thereto and a movable pulley flange mounted axially slidably on said output shaft relative to said corresponding pulley flange, and an endless belt extended between said primary and secondary variable-pitch pulleys for varying the transmission ratio between said intermediate shaft and said output shaft by varying the respective working radial positions on said primary variable-pitch pulley and said secondary variable-pitch pulley;

a clutch interposed between said input shaft and said intermediate shaft and adapted to couple said intermediate shaft with said input shaft; and a change-direction gear train with the input end thereof being connected to said input shaft, with the output end thereof being connected to said intermediate shaft, and capable of attaining forward drive and reverse drive; and said primary variable-pitch pulley and said change-direction gear train being placed between said two supporting means for supporting both ends of said intermediate shaft in said housing.

2. A belt drive continuously-variable speed automatic transmission according to claim 1, wherein said clutch and a hydraulic servomechanism for operating said clutch are mounted on said fixed flange of said primary variable-pitch pulley behind one surface thereof which is in contact with said endless belt.

3. A belt drive continuously-variable speed automatic transmission according to claim 2, wherein said change-direction gear train is a planetary gear mechanism comprising a sun gear concentrically and fixedly mounted on said input shaft, at least one planetary pinion meshing with said sun gear, at least one planetary pinion meshing with said planetary pinion as well as with a ring gear disposed concentrically with said sun gear and a planetary carrier rotatably supporting said at least two planetary pinions, said planetary carrier being engaged with and rotatable together with said fixed pulley flange of said primary variable-pitch pulley, and the ring gear of said planetary gear mechanism being adapted to be engaged with and released from said housing by means of brake.

4. A belt drive continously-variable speed automatic transmission according to claim 3, wherein a spline coupling means is provided between an annular hub formed on said fixed pulley flange concentrically thereto and said planetary carrier for engaging said planetary carrier with said fixed pulley flange of said primary variable-pitch pulley, said clutch includes friction discs supported in said annular hub and friction discs supported on a clutch hub formed on the free end of said input shaft and said hydraulic servomechanism includes a piston provided for said fixed pulley flange and slidably fitted in said annular hub.

5. A belt drive continuously-variable speed automatic transmission according to claim 2, wherein said change-direction gear train is a planetary gear mechanism comprising a sun gear concentrically and fixedly mounted on said intermediate shaft, at least one planetary pinion meshing with said sun gear, at least one planetary pinion meshing with said planetary pinion as well as with a ring gear disposed concentrically with said sun gear and a planetary carrier rotatably suppoting said two planetary pinions, said planetary carrier being fixed to the input shaft and being adapted to be engaged with and released from the fixed pulley flange of said primary variable-pitch pulley by means of said clutch, and said ring gear being adapted to be engaged with and released from said housing by means of a brake.

6. A belt drive continuously-variable speed automatic transmission according to claim 2, wherein said change-direction gear train is a planetary gear mechanism comprising a sun gear fixedly and concentrically mounted on said input shaft, a ring gear disposed concentrically with said sun gear, at least one planetary pinion meshing with said sun gear as well as with said ring gear and a planetary carrier rotatably supporting said planetary pinion, said ring gear being adapted to be engaged with and released from said fixed pulley flange of said primary variable-pitch pulley by means of said clutch, and said planetary carrier being adapted to be engaged with and released from said housing by means of said brake.

7. A belt drive continuously-variable speed automatic transmission according to claim 2, 3, 5 or 6 wherein, a hollow shaft portion for supporting said intermediate shaft is formed at one end of said input shaft, and a bearing is provided for rotatably supporting one end of said intermediate shaft within said hollow portion of the input shaft and is disposed at a position adjacent to a bearing rotatably supporting said input shaft in said housing.

8. A belt drive continuously-variable speed automatic transmission according to claim 1, and further comprising coupling means such as a torque converter or a clutch for driving said input shaft, and wherein said change-direction gear train is placed between said coupling means and primary variable-pitch pulley.

* * * * *